United States Patent [19]

Simmons

[11] 4,447,851

[45] May 8, 1984

[54] TRIP SYSTEM

[75] Inventor: Peter E. Simmons, Stockton-on-Tees, England

[73] Assignee: Imperial Chemical Industries Limited, London, England

[21] Appl. No.: 512,710

[22] Filed: Jul. 11, 1983

Related U.S. Application Data

[63] Continuation of Ser. No. 281,105, Jul. 7, 1981, abandoned.

[30] Foreign Application Priority Data

Jul. 7, 1980 [GB] United Kingdom ............... 8022205

[51] Int. Cl.³ .......................................... H02H 1/04
[52] U.S. Cl. .................................. 361/189; 361/170;
361/210; 361/1; 307/219; 307/116; 376/215; 376/259; 324/415
[58] Field of Search ................. 361/189, 170, 210, 1, 361/92, 86, 110, 104; 307/116, 219, 241; 376/215, 259; 324/415

[56] References Cited

U.S. PATENT DOCUMENTS

| 2,668,934 | 2/1954 | Nierman | 361/170 |
| 2,973,458 | 2/1961 | Nye | 376/259 X |
| 3,223,590 | 12/1965 | Troeger | 361/189 X |
| 3,425,903 | 2/1969 | Bevilacqua | 376/215 |
| 3,748,540 | 7/1973 | Eggenberger et al. | 361/189 X |

FOREIGN PATENT DOCUMENTS

| 813285 | 3/1937 | France | 361/189 |
| 888394 | 1/1962 | United Kingdom | 376/215 |

*Primary Examiner*—Patrick R. Salce
*Attorney, Agent, or Firm*—Cushman, Darby & Cushman

[57] ABSTRACT

A trip system comprises groups of three switches, each group being responsive to a single trip initiating event and each switch switching a different phase of a three phase power supply. Three trip actuators are each connected between different pairs of switches. Malfunction of a single switch in any group will not cause a trip to occur while concurrent operation of two or more switches in any group will cause a trip.

9 Claims, 2 Drawing Figures

TRIP SYSTEM

This is a continuation of application Ser. No. 281,105 filed July 7, 1981; now abandoned.

This invention relates to a trip system.

In many industrial installations, especially in the chemical industry it is necessary to install trip systems which operate to close down part or the whole of relevant plants on the occurrence of unsafe conditions. Such unsafe conditions may be for example the occurrence of a temperature or pressure in excess of safe limits or a hazardous change in the composition of a process stream.

Because of the high performance required in modern plants whilst maintaining safety a large number of trips may be necessary. If many different variables are to be monitored and a signal is obtained in respect of any of them which operates a trip, a major industrial installation may be closed down involving substantial expense and in the case of process plants the loss of considerable amounts of materials being processed, for exampled by flaring.

It has been found that faulty trip signals are often given as a result not of unsafe conditions in the plant itself but by faults in the instruments measuring the relevant variables. It is therefore common to provide three trip initiators measuring the same variable, for example three pressure, temperature or composition indicators adapted to initiate a trip, and to provide that the trip will only occur if two of the three initiators give a concordant indication. Thus if a single trip initiator gives a faulty reading no trip occurs. By a programme of regular testing, it is possible substantially to reduce the number of spurious trips by installing systems such as this, often referred to as high integrity protective systems.

As will be appreciated high integrity protective systems are inherently complex and it has been shown in practice that the complexity is such that they are frequently subject to design errors, construction errors, and testing errors. These problems in conjunction with the large number of trip initiating variables involved in modern plants means that the number of spurious trips can still be very high. Furthermore the complex logic involved in such trip systems renders them expensive to install.

The problems involved have been further increased in certain plants by the need to locate electrical switch-gear and other equipment in a safe area remote from the plant in order to reduce fire and explosion hazards and also by the need to provide for the testing of trip systems while the plant is operated.

The invention provides a comparatively simple trip system of the high integrity protective type.

The invention comprises a trip system which comprises three switches which are either normally open and are adapted to close or are normally closed and are adapted to open in response to a common trip initiating event, the switches operating on lines carrying different phases of a three phase power supply, and three trip actuators each connected between a different pair of the said lines beyond their switches, the trip actuators being adapted when normally open switches are employed to actuate a trip when both switches of the pair of lines feeding at least one of them are closed thus energising the actuator in question, or when normally closed switches are employed, to actuate a trip when no pair of lines feeding any trip actuator are both closed, that is when no actuator is energised.

The system may comprise further switches controlling the lines in response to common trip initiating events, which if the switches are normally open are in parallel and if they are normally closed are in series. Each switch in each line has its counterpart in each of the other lines; that is, to each trip initiating event one switch in each line is allotted. Thus a switch for each phase is associated with a single trip initiating event.

It is preferred that the switches should be normally closed switches. In this form of the invention failure of the three phase power supply causes the system to trip and it is therefore "fail-safe". The system using normally open switches may also be rendered "fail-safe" by generating the three phase power supply from the machine which is to be tripped. In the latter form of the invention the trip mechanism will be operable as long as the machine is on-line.

The system may if desired be operated in a non "fail-safe" mode with little risk in most circumstances providing that failure of the power supply is rare, since it would be necessary for a trip initiating event to coincide with a failure of the power supply before an unsafe condition would arise. Since equipment must be designed such that trips are comparatively infrequent if it is to be satisfactorily operated, a realistic assessment of the risk and the consequences which would follow a failure to trip in response to an unsafe condition may well lead to the conclusion that the non "fail-safe" form of the system can be satisfactorily employed.

BRIEF DESCRIPTION OF THE DRAWINGS

Two forms of the invention will now be described with reference to the accompanying drawings which show circuit diagrams of trip systems according to the invention.

The system is shown in a position where all three trip initiating events have occurred thus opening all of the switches and actuating a trip.

In normal operation all of the switches are closed and all of the coils 8, 9 and 10 are energised thus holding plate 11. Should one of the lines 2, 3 or 4 be broken by the opening of one or more switches, current continues to pass through one of the three coils, which remains connected between two live lines; pressure plate 11 is thus held by the remaining trip actuator coil. If two of the connectors 2, 3 and 4 are broken by the operation of switches the circuit through each of the three coils is broken and all three are de-energised thus allowing plate 11 to be moved in the direction of the arrow by its spring thus operating a trip.

The effect of this arrangement is that providing that two out of three strip initiator switches are in the closed position for any of the groups 5a, b and c, 6a, b and c, and 7a, b and, and that the corresponding switches of the other groups are also closed no trip actuation occurs. The opening of any two trip initiator switches of a group will initiate a trip.

Figure 1:
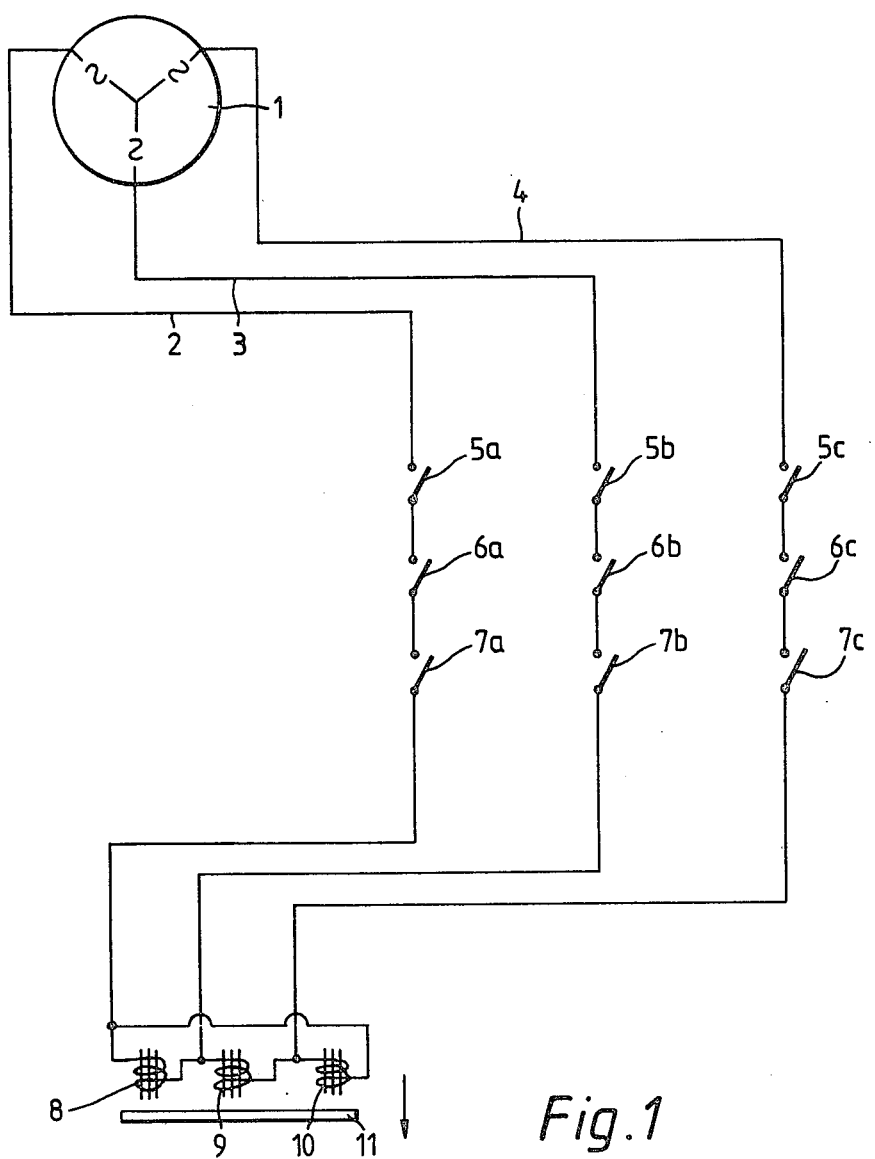
FIG. 1 shows a "fail-safe" system according to the invention in which normally closed switches are employed.
Figure 2:
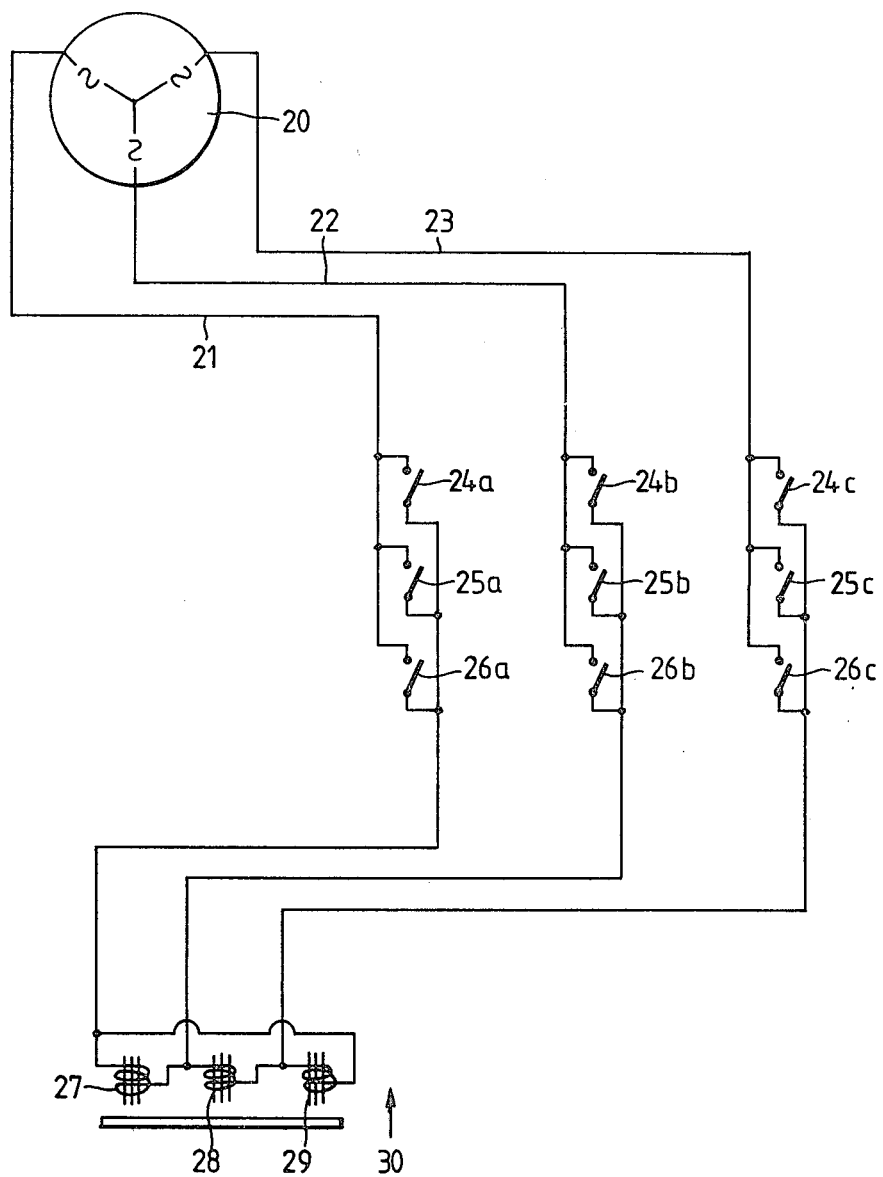
FIG. 2 shows a trip system in which normally open switches are employed. A source of a three phase alternating current 1 feeds three lines 2, 3 and 4 each of which feeds through three normally open switches labelled 5a, b, and c, 6a, b, and c and 7a, b, and c respectively. Switches 5a, b, and c are adapted to close in response to a common trip initiating event and switches 6a, b, and c and also switches 7a, b and c are adapted to close in response to different common trip initiating events. Each of lines 2, 3 and 4 lead from switches 7a, b and c respectively to trip actuator coils 8, 9 and 10 which are connected so that coil 8 is connected between conductors 2 and 3, coil 9 is connected between conductors 3 and 4 and coil 10 is connected between conductors 4 and 2. The trip actuator coils are adapted when energised, to hold a pressure plate 11, the pressure plate being spring loaded to move in the direction of the arrow when the coils are de-energised thus actuating a trip.

FIG. 2 shows a trip system in which normally open switches are employed. A three phase power supply 20 feeds three conductors 21, 22 and 23 each of which feed three normally open switches arranged in parallel, 24a, b and c, 25a, b and c and 26a, b and c respectively where the switches identified as (a) break line 21 those identified as (b) break line 22 and those identified as (c) break line 23. Lines 21, 22 and 23 lead from the switches to trip actuator coils 27, 28 and 29 such that coil 27 is connected between conductors 21 and 22, coil 28 is connected between conductors 22 and 23 and coil 29 is connected between conductors 23 and 21. When any of the three coils 27, 28 and 29 are energised it attracts plate 30 in the direction shown by the arrow thus actuating a trip. The system is shown in its normally open state, no trip being actuated.

Each of the switches 24a, b and c are adapted to close in response to a common trip initiating event. The switches of each of the groups 25a, b and c and 26a, b and c are also adapted to close in response to common trip initiating events. If any two switches of a group close current passes through the coil across which they are connected attracting plate 30 and thus actuating a trip. If only one switch closes no complete circuit across any of the trip actuator coils is complete and no trip occurs.

In both of the above systems the failure of a single trip initiator of a group will not suffice to cause a trip; concordant behaviour of two switches is necessary to cause this to happen.

I claim:

1. A trip system which comprises:
    three switches which are each either (a) normally open and adapted to close or (b) normally closed and adapted to open in response to a common trip initiating event,
    each of said switches being connected to and operating on a respectively corresponding one of three lines carrying the different respective phases of a three phase power supply,
    three trip actuators each electrically connected between a different pair of the said lines, one of said switches being connected on each of the lines between the power supply and the trip actuators,
    the trip actuators being adapted, when normally open switches are employed, to actuate a trip when both switches of the pair of lines connected to at least one of the actuators are closed thus energising the actuator in question, and
    the trip actuators being adapted, when normally closed switches are employed, to actuate a trip when both the switches in any pair of said lines are opened thus de-energising the actuators.

2. A trip system as claimed in claim 1 in which a plurality of switches is provided in each line, a switch in each line being responsive to the same trip initiating event as a switch in each of the other lines, and wherein, if the switches are of the normally open type, they are in parallel, and if they are of the normally closed type, they are in series.

3. A trip system as in claim 1 in which the switches are normally closed switches.

4. A trip system as in claim 1 in which the switches are normally open switches and in which the three phase power supply is generated from the machine which is to be tripped.

5. A high integrity protective trip system for triggering the shut down of an associated system but only if at least two out of three trip initiators monitoring the same system variable provide a concurrent indication of the need for shut down, said trip system comprising:
    a three phase electrical power supply means having at least three electrical power supplying terminals a, b, c providing three distinct electrical voltages between each of the three possible pairs a-b, b-c, a-c of terminals thus defined;
    three electrical trip initiator switches having respective electrical contacts independently actuated in response to the detected variation of the same predetermined system variable;
    three electrically operated trip actuators mutually arranged so as to prevent tripping unless at least two of the actuators are concurrently placed in a common predetermined electrical status; and
    three electrical lines A, B, C connecting said trip actuators to said three terminals a, b, c through respective ones of said three electrical switch contacts such that each actuator is thereby electrically connectable between a respectively corresponding one of the terminal pairs a-b, b-c, a-c.

6. A high integrity protective trip system as in claim 3 wherein said electrical contacts are normally open.

7. A high integrity protective trip system as in claim 4 further comprising plural sets of three electrical trip initiator switches with respectively corresponding ones of the electrical contacts of each set being serially connected in a respectively corresponding one of said lines.

8. A high integrity protective trip system as in claim 3 wherein said electrical contacts are normally closed.

9. A high integrity protective trip system as in claim 6 further comprising plural sets of three electrical trip initiator switches with respectively corresponding ones of the electrical contacts of each set being connected in parallel, the parallel-connected combination being, in turn, serially connected in a respectively corresponding one of said lines.

* * * * *